J. A. SCHARWATH.
ROOFING MATERIAL.
APPLICATION FILED NOV. 5, 1918.
1,296,324.
Patented Mar. 4, 1919.
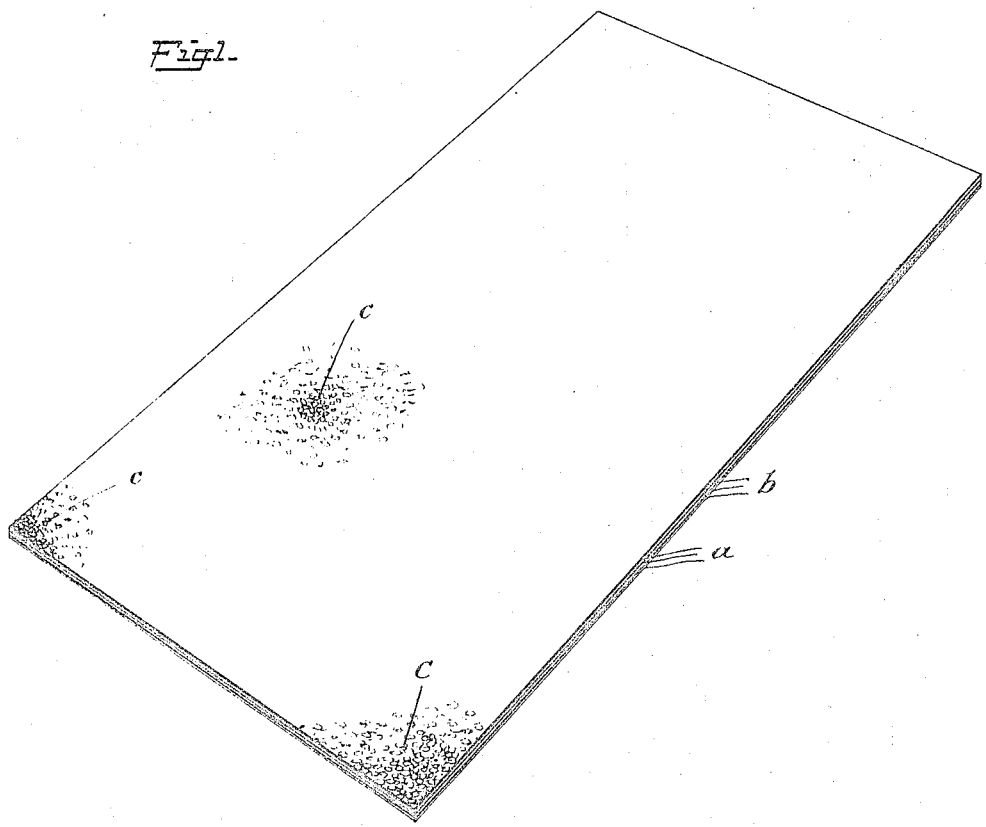
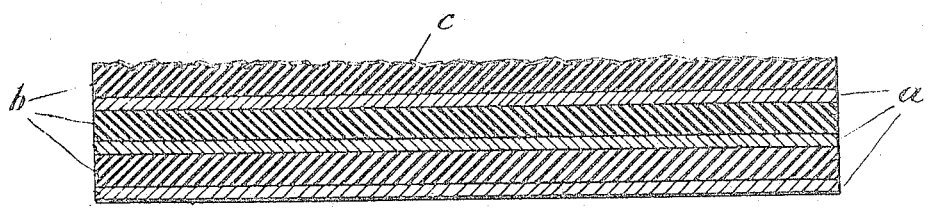
Inventor
John A. Scharwath
By his Attorneys
Marshall & Dearborn

UNITED STATES PATENT OFFICE.

JOHN A. SCHARWATH, OF ELIZABETH, NEW JERSEY.

ROOFING MATERIAL.

1,296,324.

Specification of Letters Patent.

Patented Mar. 4, 1919.

Application filed November 5, 1918. Serial No. 261,231.

*To all whom it may concern:*

Be it known that I, JOHN A. SCHARWATH, a citizen of the United States of America, and a resident of Elizabeth, Union county, and State of New Jersey, have invented certain new and useful Improvements in Roofing Material, of which the following is a specification, reference being had to the accompanying drawing, forming a part thereof.

My invention relates to composite roofing and has special reference to such as are constructed complete and sold in rolls or sheets in contradistinction to roofings which are composite but are built up on the job.

One object of my invention is to provide an improved composite roofing which shall have a fire-proof inner layer and combine the advantages of various known roofings without materially increasing the cost of production.

Another object is to provide a multiply roofing material in which each alternate layer consists of unsaturated asbestos felt separated by distinct, relatively thick layers of asphalt with the inner layers asbestos and the top or outer layer, which is exposed to the weather, asphalt, provided with a surface coating of slate or stone.

In order that my invention may be thoroughly understood I will now proceed to describe the same in the following specification, and will then point out the novel features thereof in appended claims.

Referring to the drawings:

Figure 1 is a perspective view of a sheet of composite roofing and

Fig. 2 is a sectional view drawn to a relatively large scale to distinctly illustrate the layers of which the roofing is composed.

My improved roofing differs from those hitherto known such as, for example, that shown and described in the Bishopric Patent 817,619, in that there are a plurality of layers of unsaturated asbestos felt between which are distinct relatively thick layers of asphalt. Bishopric utilizes a layer of tar paper, which of course is a saturated layer and is not fire-proof, and he cements his layers together by a mixture of lime and asphalt.

In constructions where layers are merely cemented together and particularly where they are saturated and cemented together by a thin coating of asphalt, as is usual in the trade, the life of the material is limited. On the other hand, in my improved roofing where the layers of asphalt are comparatively thick, there is no disintegration after long periods of service and the roof is substantially unimpaired as far as its weather-proof qualities are concerned.

For the bottom or inner layer I utilize an unsaturated asbestos felt sheet. In this way I have a maximum protection against fire breaking out through the roof from the inside. On the outer surface I have a layer of asphalt provided with a surface coating of crushed slate or stone. This makes not only an attractive outer surface but is also very durable and water-proof.

In the drawings—A designates the unsaturated asbestos felt layers, B the thick asphalt layers interposed between the asbestos felt layers, and C designates the weather surface which is slated.

Having described my invention, what I claim is:

1. A composite roofing material comprising an under layer of unsaturated asbestos felt, a plurality of superposed layers of unsaturated asbestos felt with interposed thick layers of asphalt, and a top layer of asphalt having small slate or stone particles set into the asphalt to provide a slate or stone outer surface.

2. A multi-ply composite roofing material comprising a plurality of layers of unsaturated asbestos felt and thick interposed layers of asphalt with an outer asphalt layer provided with an exposed surface of slate or stone.

In witness whereof, I have hereunto set my hand this 4th day of November, 1918.

JOHN A. SCHARWATH.